(12) United States Patent
Hirsch

(10) Patent No.: US 10,164,502 B1
(45) Date of Patent: Dec. 25, 2018

(54) MOBILE DIESEL GENERATOR AND POWER PROPULSION SYSTEM

(71) Applicant: Nicholas R. Hirsch, Pewaukee, WI (US)

(72) Inventor: Nicholas R. Hirsch, Pewaukee, WI (US)

( * ) Notice: Subject to any disclaimer, the term of this patent is extended or adjusted under 35 U.S.C. 154(b) by 55 days.

(21) Appl. No.: 15/437,571

(22) Filed: Feb. 21, 2017

Related U.S. Application Data

(60) Provisional application No. 62/299,025, filed on Feb. 24, 2016.

(51) Int. Cl.
| | | |
|---|---|---|
| *B60L 11/02* | (2006.01) | |
| *H02K 7/18* | (2006.01) | |
| *H02P 3/14* | (2006.01) | |
| *B60L 11/08* | (2006.01) | |
| *B60L 11/10* | (2006.01) | |
| *B60L 11/12* | (2006.01) | |
| *B60L 11/18* | (2006.01) | |

(52) U.S. Cl.
CPC ............ *H02K 7/1815* (2013.01); *B60L 11/02* (2013.01); *B60L 11/08* (2013.01); *B60L 11/10* (2013.01); *B60L 11/12* (2013.01); *B60L 11/1814* (2013.01); *H02P 3/14* (2013.01); *B60L 2200/12* (2013.01); *B60L 2210/30* (2013.01); *B60L 2210/40* (2013.01); *B60L 2220/44* (2013.01); *B60Y 2400/435* (2013.01)

(58) Field of Classification Search
CPC ... H02K 7/1815; B60L 11/1814; B60L 11/12; B60L 11/08; B60L 11/02; B60L 11/10; B60L 2200/12; B60L 2210/30; B60L 2220/44; B60L 2210/40; H02P 3/14; B60Y 2400/435
See application file for complete search history.

(56) References Cited

U.S. PATENT DOCUMENTS

| | | | | |
|---|---|---|---|---|
| 9,461,496 | B1 * | 10/2016 | Zhang | H02J 7/007 |
| 9,694,698 | B2 * | 7/2017 | Ogawa | B60L 11/1864 |
| 9,956,882 | B2 * | 5/2018 | Iida | B60L 11/02 |
| 2003/0066695 | A1 * | 4/2003 | Beckerman | B60T 1/10 180/65.29 |
| 2006/0028178 | A1 * | 2/2006 | Hobbs | B60L 3/0046 320/128 |
| 2006/0250902 | A1 * | 11/2006 | Bender | B60L 11/1868 369/1 |

(Continued)

*Primary Examiner* — Jacob B Meyer
(74) *Attorney, Agent, or Firm* — Donald J. Ersler

(57) ABSTRACT

A mobile diesel generator and propulsion system preferably includes a diesel engine, a vehicle platform, a generator with voltage inverter, a battery charging system, at least one storage battery, an AC voltage to DC voltage converter, a motor controller and an AC motor. The generator with voltage inverter is driven by the diesel engine. The battery charging system receives AC voltage from the generator with voltage inverter and outputs a DC voltage to charge the at least one storage battery. The AC voltage to DC voltage converter receives output from the generator with voltage inverter and outputs a DC voltage to the motor controller. The motor controller receives DC voltage output from either the AC voltage to DC voltage converter or the at least one storage battery and outputs AC voltage to the AC voltage motor. The AC voltage motor drives a rear wheel of the vehicle platform.

14 Claims, 3 Drawing Sheets

(56) References Cited

U.S. PATENT DOCUMENTS

| | | | |
|---|---|---|---|
| 2010/0138087 A1* | 6/2010 | Takaoka | B60K 6/365 |
| | | | 701/22 |
| 2011/0004363 A1* | 1/2011 | Severinsky | B60H 1/004 |
| | | | 701/22 |
| 2015/0175018 A1* | 6/2015 | Ogawa | B60L 11/1864 |
| | | | 320/109 |
| 2015/0280480 A1* | 10/2015 | Mitri | H02J 7/0068 |
| | | | 307/22 |
| 2016/0207403 A1* | 7/2016 | Iida | B60L 11/02 |
| 2016/0347183 A1* | 12/2016 | Kusumi | B60L 11/00 |
| 2017/0203661 A1* | 7/2017 | Nishinaka | B60L 11/1816 |
| 2017/0355259 A1* | 12/2017 | Borud | B60K 6/442 |

* cited by examiner

MOBILE DIESEL GENERATOR AND POWER PROPULSION SYSTEM

CROSS-REFERENCES TO RELATED APPLICATIONS

This is a utility patent application taking priority from provisional application No. 62/299,025 filed on Feb. 24, 2016.

BACKGROUND OF THE INVENTION

Field of the Invention

The present invention relates generally to electrical power generation and more specifically to a mobile diesel generator and power propulsion system, which includes low emissions.

Discussion of the Prior Art

The earth stores carbon dioxide ($CO_2$), one of the greenhouse gases, in the atmosphere, water and land. There is a continuous cycle of capture and release between these elements. However, at this time in the earth's history we are experiencing an imbalance of this cycle with a greater release of $CO_2$ from the land (soil, plants and animals) into the atmosphere than what can be sequestered by plants both on land and water. One major factor is the increased release of $CO_2$ to the atmosphere from the captured $CO_2$ of millions of years ago through the burning of carbon-based fossil fuels. The need to reduce the net release of $CO_2$ through reduced burning of these fuels and the increased capture of $CO_2$ through the use of renewable and bio-based fuels is an important goal for providing clean air. It appears that the prior art does not teach or suggest a mobile diesel generator and power propulsion system, which emits low emissions.

Accordingly, there is a clearly felt need in the art for a mobile diesel generator and power propulsion system, which emits low emissions; includes a diesel motor with variable valve timing and compression; and includes regenerative braking.

SUMMARY OF THE INVENTION

The present invention provides a mobile diesel generator and power propulsion system, which includes a diesel motor with variable valve timing and compression. The mobile diesel generator and propulsion system preferably includes a diesel engine, a vehicle platform, a generator with voltage inverter, a battery charging system, at least one storage battery, an AC voltage to DC voltage converter, a motor controller and an AC motor. The diesel engine includes low emissions, variable valve timing, variable compression and is either naturally aspirated or preferably turbo charged. The naturally aspirated diesel engine includes an air inlet. The vehicle platform is preferably a motorcycle without a gasoline engine. The diesel engine is mounted on the vehicle platform instead of the gasoline engine. The generator with voltage inverter includes a generator, which outputs AC voltage to an AC voltage inverter. The AC voltage inverter receives an inconsistent variable AC voltage and frequency output from the generator, and converts the generator output to a smooth and consistent AC voltage and frequency. The generator with voltage inverter is driven by the diesel engine.

The battery charging system receives AC voltage from the AC voltage inverter and outputs a DC voltage. The DC voltage output of the battery charging system is used to charge the at least one storage battery. The battery charging system may also receive AC voltage through a plug-in source, such as a 120 volt AC 50 Hz or 60 Hz building electrical outlet. The AC voltage to DC voltage converter receives output from the AC voltage inverter. The AC voltage to DC voltage converter converts the AC voltage input into a DC voltage output. The motor controller receives DC voltage output from either the AC voltage to DC voltage converter or the at least one storage battery and outputs AC voltage. The AC voltage motor receives AC voltage output from the motor controller. The AC voltage motor drives a rear wheel of the vehicle platform through a chain drive, a belt, gear/shaft, hub motor or any other suitable method. AC voltage motor is also used as an AC voltage generator during braking of the vehicle platform. The AC motor sends AC voltage to the motor controller, which converts the AC voltage into DC voltage. The DC voltage from the motor controller is stored in the at least one battery. A second embodiment uses a DC voltage generator and a DC to AC voltage inverter instead of the AC generator and AC to AC voltage inverter.

Accordingly, it is an object of the present invention to provide a mobile diesel generator and power propulsion system, which emits low emissions It is a further object of the present invention to provide a mobile diesel generator and power propulsion system, which includes a diesel motor with variable valve timing and compression; and a very low emission combustion system.

Finally, it is another object of the present invention to provide a mobile diesel generator and power propulsion system, which includes regenerative braking.

These and additional objects, advantages, features and benefits of the present invention will become apparent from the following specification.

DETAILED DESCRIPTION OF THE PREFERRED EMBODIMENTS

Figure 1:
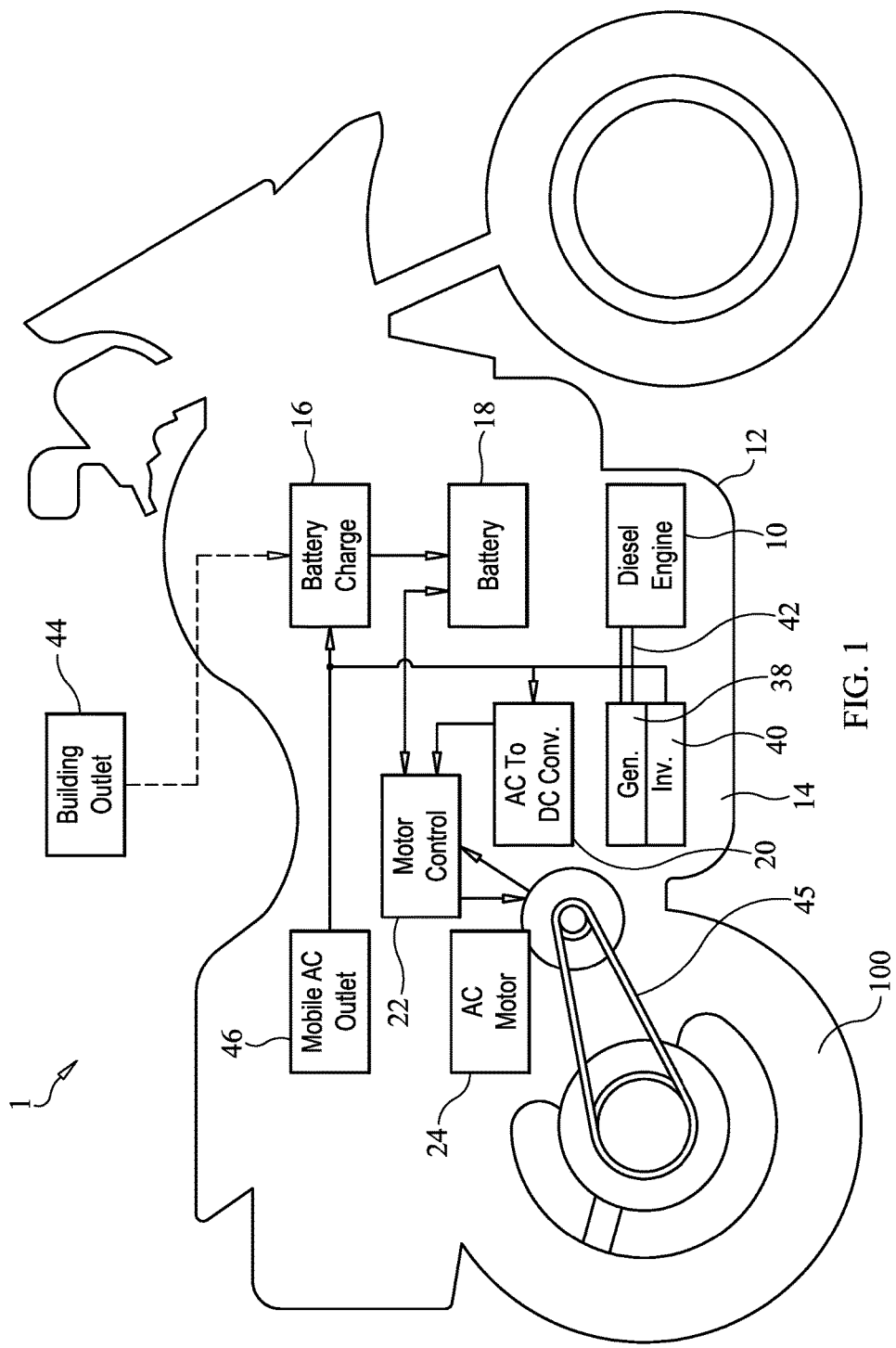
FIG. 1 is a schematic diagram of a mobile diesel generator and power propulsion system in accordance with the present invention.
Figure 1A:
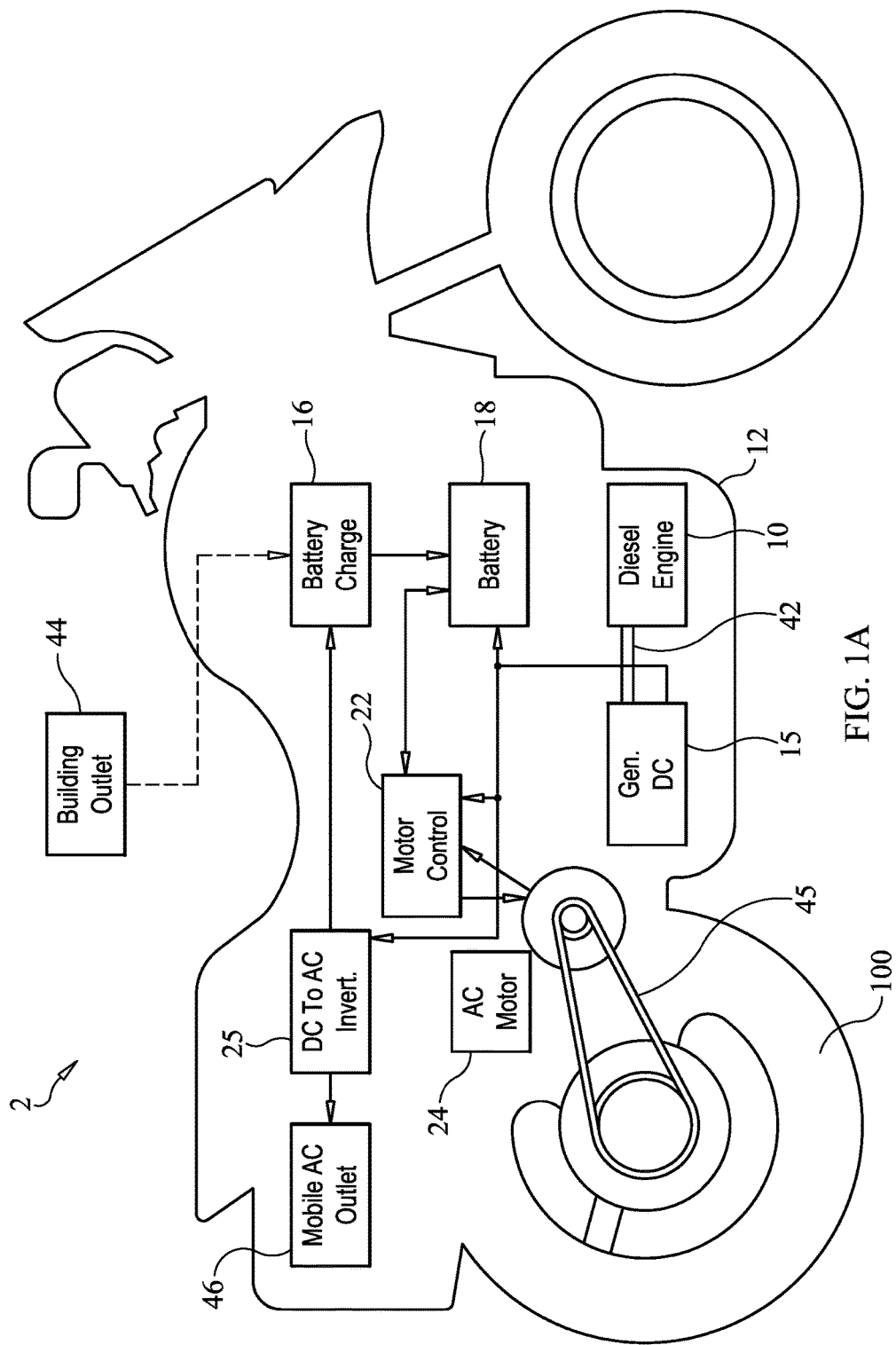
FIG. 1a is a schematic diagram of a mobile diesel generator and power propulsion system in accordance with the present invention.

With reference now to the drawings, and particularly to FIG. 1, there is shown a schematic diagram of a mobile diesel generator and power propulsion system 1. The mobile diesel generator and propulsion system 1 preferably includes a diesel engine 10, a vehicle platform 12, a generator with voltage inverter 14, a battery charging system 16, at least one storage battery 18, an AC voltage to DC voltage converter 20, a motor controller 22 and an AC motor 24. With reference to FIG. 1a, the mobile diesel generator and propulsion system 2 preferably includes the diesel engine 10, the vehicle platform 12, a DC generator 15, the battery charging system 16, the at least one storage battery 18, a motor controller 22, an AC motor 24 and a DC to AC voltage inverter 25.

Figure 2:
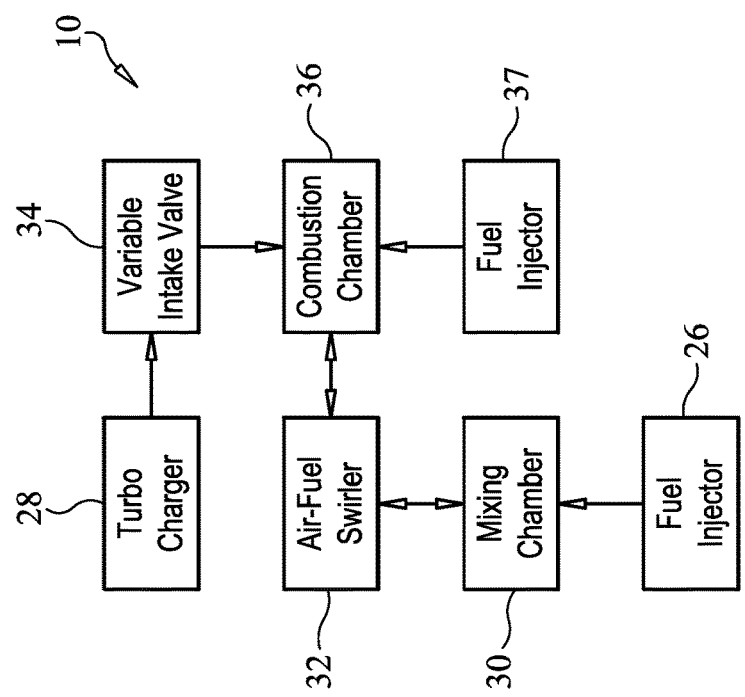
FIG. 2 is a schematic diagram of a diesel engine of a mobile diesel generator and power propulsion system in accordance with the present invention.

With reference to FIG. 2, the diesel engine 10 includes electronic fuel injector 26, a turbo charger 28, a mixing chamber 30, an air-fuel swirler 32, variable timed intake valve 34 and a combustion chamber 36. The fuel delivered from the electronic fuel injector 26 is mixed with back flow air from the combustion chamber 36 in the mixing chamber 30 to provide an air-fuel mixture. The air-fuel mixture is preferably a rich/lean ratio of 8 or 25 to greatly reduce $NO_x$ formation. The fuel air mixture is swirled in the air-fuel swirler 32 and forced in to the combustion chamber 36. Pressurized air from the turbo charger 28 enters the combustion chamber 36, when the variable intake valve 34 is opened. The combustion chamber 36 may have a second electronic fuel injector 37 to maintain an overall very lean, low $NO_x$ and $CO_2$ emission air/fuel ratio.

Figure 3:
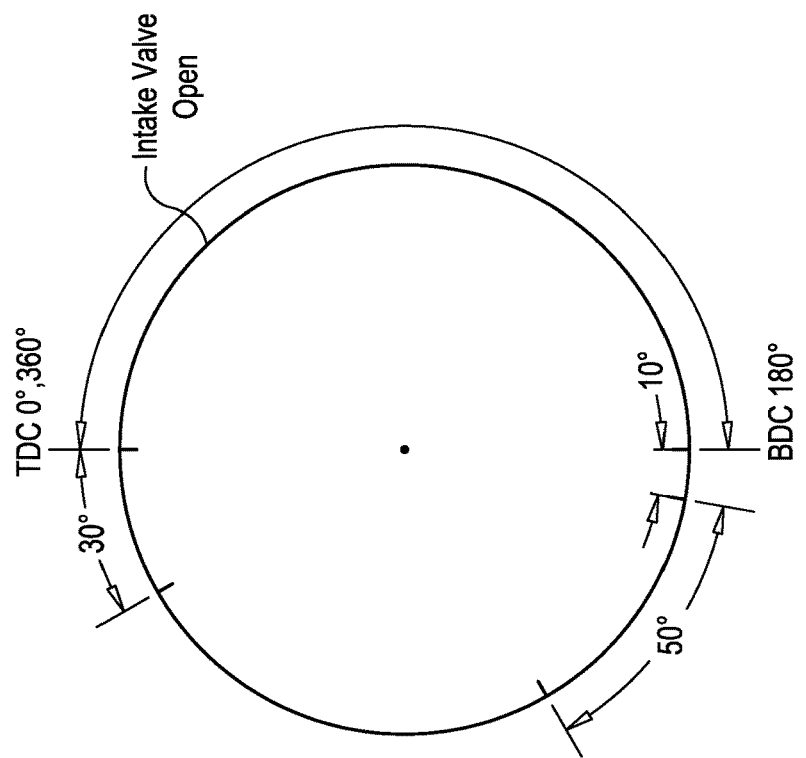
FIG. 3 is a schematic diagram of an variable intake valve of a diesel engine of a mobile diesel generator and power propulsion system in accordance with the present invention.

With reference to FIG. 3, the variable intake valve 34 preferably includes being opening for 240 degrees. The circle in FIG. 3 illustrates the motion of a crankshaft of the diesel engine 10. Normally, an intake valve is opened at top dead center (TDC) of 0 degrees, continuing open past bottom dead center (BDC) of 180 degrees and closing at 190 degrees. However, to improve efficiency of the diesel engine 10, the intake valve remains open for an additional 50 degrees. The effective compression is reduced from 170 degrees-50 degrees to 120 degrees, which provides a 14-1 compression ratio. If the intake valve is opened 30 degrees before top dead center and closed 10 degrees after bottom dead center, a compression ratio of 17-1 is provided.

The vehicle platform 12 is preferably a motorcycle without a gasoline engine, but other vehicle platforms could also be used. The diesel engine 10 is mounted on the vehicle platform 12 instead of a typical gasoline engine. The generator with voltage inverter 14 includes a generator 38 and an AC voltage inverter 40. The generator 38 outputs AC voltage to an AC voltage inverter 40. The AC voltage inverter 40 receives an inconsistent variable AC voltage and frequency output from the generator 38, and converts the AC voltage output of the generator 38 into a smooth and consistent AC voltage and frequency. The generator with voltage inverter 14 is driven by an output shaft 42 of the diesel engine 10.

The battery charging system 16 receives AC voltage from the AC voltage inverter 40 and outputs a DC voltage. The DC voltage output of the battery charging system 16 is used to charge the at least one storage battery 18. The battery charging system 16 may also receive AC voltage through a plug-in source, such as a 120 volt AC 50 Hz or 60 Hz building outlet 44. The AC voltage to DC voltage converter 20 receives output from the AC voltage inverter 40. The AC voltage to DC voltage converter 20 converts the AC voltage input into a DC voltage output. The motor controller 22 receives DC voltage output from either the AC voltage to DC voltage converter 20, or the at least one storage battery 18 and outputs AC voltage. The AC voltage motor 24 receives AC voltage output from the motor controller 22. The AC voltage motor 24 preferably drives a rear wheel 100 of the vehicle platform 12 through a chain drive 44. However, the rear wheel 100 may be driven with a chain, belt, a gear shaft drive, hub motor or any other suitable method. The AC voltage motor 24 is also used as an AC voltage generator during braking of the vehicle platform 12. During regenerative braking, the AC motor sends AC voltage to the motor controller 22, which converts the AC voltage into DC voltage. The DC voltage from the motor controller 22 is stored in the at least one battery 18. The mobile diesel generator and propulsion system 1 may be used as a portable electrical generator by plugging into a mobile AC outlet 46.

With reference to FIG. 1a, the DC voltage generator 25 is driven by the output shaft 42 of the diesel engine 10. The DC to AC voltage inverter 25 receives DC voltage from the DC voltage generator 25. The DC to AC voltage inverter 25 supplies AC voltage to the battery charging system 16 and outputs a DC voltage to the at least one storage battery 18. The battery charging system 16 may also receive AC voltage through a plug-in source, such as a 120 volt AC 50 Hz or 60 Hz building outlet 44. The motor controller 22 receives DC voltage from the DC generator 15. The AC voltage motor 24 receives AC voltage output from the motor controller 22. The AC voltage motor 24 preferably drives a rear wheel 100 of the vehicle platform 12 through a chain drive 44. However, the rear wheel 100 may be driven with a belt, a gear shaft drive or any other suitable method. The AC voltage motor 24 is also used as an AC voltage generator during braking of the vehicle platform 12. During regenerative braking, the AC motor sends AC voltage to the motor controller 22, which converts the AC voltage into DC voltage. The DC voltage from the motor controller 22 is stored in the at least one battery 18. The mobile diesel generator and propulsion system 2 may be used as a portable electrical generator by plugging into a mobile AC outlet 46.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A mobile diesel generator and power propulsion system comprising:
   a vehicle platform including at least two wheels;
   a diesel engine having an output shaft;
   a generator is rotated by said output shaft, said generator outputs an AC voltage;
   a battery charger receives said AC voltage from said generator;
   at least one battery receives DC voltage from said battery charger;
   an AC voltage to DC voltage converter receives said AC voltage from said generator;
   a motor controller receives a DC voltage from said AC voltage to DC voltage converter, said motor controller outputs a motor AC voltage; and
   an AC voltage motor receives said motor AC voltage from said motor controller, said AC voltage motor rotates at least one of said at least two wheels;
   said diesel engine includes a mixing chamber that combines an input from an electronic fuel injector and one of a turbo charger and an air inlet; and
   an output of said mixing chamber is swirled in an air-fuel swirler.

2. The mobile diesel generator and power propulsion system of claim 1 wherein:
   said AC voltage motor charges said at least one battery through said motor controller when said vehicle platform is decelerated.

3. The mobile diesel generator and power propulsion system of claim 1 wherein:
   said at least one battery is charged by plugging said battery charger into an electrical wall outlet of a building.

4. The mobile diesel generator and power propulsion system of claim 1 wherein:
said AC voltage motor rotates at least one of said at least two wheels through one of a chain drive, a belt and a gear shaft combination, or hub motor.

5. The mobile diesel generator and power propulsion system of claim 1 wherein:
an output of said air-fuel swirler is fed into a combustion chamber of said diesel engine.

6. The mobile diesel generator and power propulsion system of claim 5 wherein:
a second fuel injector provides an output directly into said combustion chamber.

7. A mobile diesel generator and power propulsion system comprising:
a vehicle platform including at least two wheels;
a diesel engine having an output shaft;
a generator is rotated by said output shaft, said generator outputs an AC voltage;
a battery charger receives said AC voltage from said generator;
at least one battery receives DC voltage from said battery charger;
an AC voltage to DC voltage converter receives said AC voltage from said generator;
a motor controller receives a DC voltage from said AC voltage to DC voltage converter, said motor controller outputs a motor AC voltage; and
an AC voltage motor receives said motor AC voltage from said motor controller, said AC voltage motor rotates at least one of said at least two wheels;
said generator includes an AC voltage inverter that receives an output from said generator, said AC voltage inverter outputs a smooth and consistent AC voltage; and
a mobile ac outlet is connected to an output of said AC voltage inverter.

8. The mobile diesel generator and power propulsion system of claim 7 wherein:
said AC voltage motor charges said at least one battery through said motor controller when said vehicle platform is decelerated.

9. The mobile diesel generator and power propulsion system of claim 7 wherein:
said at least one battery is charged by plugging said battery charger into an electrical wall outlet of a building.

10. The mobile diesel generator and power propulsion system of claim 7 wherein:
said AC voltage motor rotates at least one of said at least two wheels through one of a chain drive, a belt and a gear shaft combination, or hub motor.

11. The mobile diesel generator and power propulsion system of claim 7 wherein:
said diesel engine includes a mixing chamber that combines an input from an electronic fuel injector and one of a turbo charger and an air inlet.

12. The mobile diesel generator and power propulsion system of claim 11 wherein:
an output of said mixing chamber is swirled in an air-fuel swirler.

13. The mobile diesel generator and power propulsion system of claim 12 wherein:
an output of said air-fuel swirler is fed into a combustion chamber of said diesel engine.

14. The mobile diesel generator and power propulsion system of claim 13 wherein:
a second fuel injector provides an output directly into said combustion chamber.

* * * * *